US008853112B2

(12) United States Patent
Nonnet et al.

(10) Patent No.: US 8,853,112 B2
(45) Date of Patent: Oct. 7, 2014

(54) SINTERED BEAD BASED ON ZIRCONIA AND ON CERIUM OXIDE

(75) Inventors: Emmanuel Nonnet, Sarrians (FR); Rimma Khodakovskaya, Haifa (IL); Moshe Link, Haifa (IL); Marcel Yancu, Nazareth Illit (IL); Andrei Schon, Kyriat Motzkin (IL); Eric Hanus, Les Taillades (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 1087 days.

(21) Appl. No.: 11/885,333

(22) PCT Filed: Feb. 27, 2006

(86) PCT No.: PCT/FR2006/000437
§ 371 (c)(1),
(2), (4) Date: Aug. 30, 2007

(87) PCT Pub. No.: WO2006/092486
PCT Pub. Date: Sep. 8, 2006

(65) Prior Publication Data
US 2009/0120010 A1    May 14, 2009

(30) Foreign Application Priority Data
Mar. 1, 2005 (FR) .................................... 05 02057

(51) Int. Cl.
| C03C 14/00 | (2006.01) |
| C04B 35/00 | (2006.01) |
| C04B 35/50 | (2006.01) |
| C04B 35/51 | (2006.01) |
| C04B 35/486 | (2006.01) |
| C04B 35/63 | (2006.01) |
| C04B 35/636 | (2006.01) |
| B02C 17/20 | (2006.01) |
| C04B 35/626 | (2006.01) |
| C04B 35/624 | (2006.01) |
| C04B 35/632 | (2006.01) |

(52) U.S. Cl.
CPC .......... *C04B 35/486* (2013.01); *C04B 2235/96* (2013.01); *C04B 2235/3284* (2013.01); *C04B 2235/3229* (2013.01); *C04B 2235/3232* (2013.01); *C04B 35/63* (2013.01); *C04B 35/636* (2013.01); *C04B 2235/94* (2013.01); *C04B 2235/5445* (2013.01); *C04B 2235/3262* (2013.01); *B02C 17/20* (2013.01); *C04B 35/6261* (2013.01); *C04B 2235/77* (2013.01); *C04B 2235/3272* (2013.01); *C04B 2235/3294* (2013.01); *C04B 35/624* (2013.01); *C04B 35/632* (2013.01); *C04B 2235/72* (2013.01); *C04B 2235/3267* (2013.01); *C04B 2235/3281* (2013.01); *C04B 35/62625* (2013.01); *C04B 2235/3225* (2013.01); *C04B 2235/3217* (2013.01)
USPC ............... 501/33; 501/134; 501/152

(58) Field of Classification Search
USPC ............................................ 501/33, 134, 152
See application file for complete search history.

(56) References Cited

U.S. PATENT DOCUMENTS

| 4,690,910 A | 9/1987 | Tsukuma et al. |
| 4,690,911 A | 9/1987 | Nakada |
| 4,820,667 A * | 4/1989 | Tsunekawa et al. .......... 501/104 |
| 6,068,828 A * | 5/2000 | Hata et al. ...................... 423/608 |
| 6,121,177 A | 9/2000 | Guigonis et al. |
| 2003/0110707 A1 | 6/2003 | Rosenflanz et al. |
| 2003/0126804 A1* | 7/2003 | Rosenflanz et al. ............. 51/307 |

FOREIGN PATENT DOCUMENTS

| CN | 1253126 A | 5/2000 |
| EP | 0 269 108 A2 | 6/1988 |
| EP | 0137134 B1 | 5/1989 |
| EP | 0466836 B1 | 8/1995 |
| GB | 2305430 A | 4/1997 |
| JP | 59162173 A | 9/1984 |
| JP | 60-90870 | 5/1985 |
| JP | 60-108367 | 6/1985 |
| JP | 64-3071 A | 1/1989 |
| JP | 08-269755 A | 10/1996 |
| JP | 2001080919 A | 3/2001 |
| JP | 2002355569 A | 12/2002 |
| WO | 0170643 A2 | 9/2001 |
| WO | 03072678 A1 | 9/2003 |

OTHER PUBLICATIONS

Japanese Office Action, Dec. 6, 2011, in Application No. 2007-557533.
Wang et al., "The grain boundary modification of ceria-stabilized tetragonal zirconia polycrystals by a small amount of alumina addition", Journal of Materials Science Letters, vol. 12, pp. 702-705, 1995.
Tsai et al., "Transformation Plasticity and Toughening in CeO2-Partially_Stabilized Zirconia-Alumina (Ce-TZP/Al2O3) Composites Doped with MnO", Journal American Ceramic Society, vol. 75 (5), pp. 1229-1239, 1992.
Internal reports of JYOTI Ceramic Industries, Zirconox beads, T-4 030804, Micro A, Aug. 16, 2004, time 12:25:13.

(Continued)

*Primary Examiner* — Shuangyi Abu Ali
(74) *Attorney, Agent, or Firm* — Young & Thompson

(57) ABSTRACT

A sintered bead presenting the following chemical analysis, in percentages by weight and for a total of 100%: $ZrO_2 + HfO_2$: 78%-85%; $CeO_2$: ≥15%; $Al_2O_3$: >0.1%; additive: >0.1%; impurities: <1%; the additive being selected from $MnO$, $MnO_2$, $Fe_2O_3$, $CuO$, $TiO_2$, $Y_2O_3$, $Sb_2O_3$, $ZnO$, and mixtures thereof. Application to microgrinding and to microdispersion.

20 Claims, No Drawings

(56) References Cited

OTHER PUBLICATIONS

Internal reports of JYOTI Ceramic Industries, Zirconox MicroMedia, Production Sample, Micro A, Mar. 5, 2002, time 00:04:39.

Delivery notes of JYOTI Ceramic Industries, Bill of Lading for Combined Transport of Port-to-Port Shipment Nos. C010481, C-010440, C010415, C010404; Albatros Sea-Air Service No. CTD-2014285; New Globe Air Services Limited No. MUM/JHB/0320/02-03; Blue Moon Express Ltd. No. BME/NHS/SAF/1003011 and No. BME/NHS/CS/1002950; British Airways World Cargo No. 125-71205190; and Swift Global Line No. 39605 PLDA.

Export shipment details, JYOTI Ceramic Industries, D7.

Hong et al., Effect of Fe2O3 and Al2O3 Addition on Microstructure and Mechanical Properties of Ce—TZP Ceramics; slides of the presentation at "Aust. Ceram-2002", Sep. 30 to Oct. 3, 2002 at East Perth Campus of Central TAFE in Perth, Australia.

Hong et al., Effect of Fe2O3 and Al2O3 on Microstructure and Mechanical Properties of Ce-TZP Ceramics; Proceedings of "Aust. Ceram-2002", Sep. 30 to Oct. 3, 2002 at East Perth Campus of Central TAFE in Perth, Australia.

Affidavit from Mr. Hong.

* cited by examiner

SINTERED BEAD BASED ON ZIRCONIA AND ON CERIUM OXIDE

BACKGROUND OF THE INVENTION

1. Field of the Invention

The invention relates to sintered beads based on zirconia and on cerium oxide, and to their use in grinders.

2. Description of the Related Art

A desired quality for sintered beads that are to serve in microgrinder and microdispersion applications, e.g. with pigments for paints, is their resistance to wear.

It is known that density is an important parameter and it is known that the density of a sintered product can be increased by raising the sintering temperature. Nevertheless, such an increase in temperature is expensive, and also leads to a modification to the microscopic structure of the product, which can harm its performance.

There thus exists a need for a sintered bead that presents good resistance to wear and that is capable of being fabricated by sintering at relatively low temperatures.

SUMMARY OF THE INVENTION

The object of the invention is to satisfy this need.

According to the invention, this object is achieved by means of a sintered bead presenting the following chemical analysis, in percentages by weight and for a total of 100%:

$ZrO_2+HfO_2$: 78%-85%;
$CeO_2$: ≥15%;
$Al_2O_3$: >0.1%;
additive: >0.1%;
impurities: <1%;

the additive being selected from $MnO$, $MnO_2$, $Fe_2O_3$, $CuO$, $TiO_2$, $Y_2O_3$, $Sb_2O_3$, $ZnO$, and mixtures thereof.

DETAILED DESCRIPTION OF THE INVENTION

As explained in greater detail in the description below, the combination of alumina and of the additive has a synergistic effect and enables resistance to wear to be improved considerably. Good resistance to wear can thus be obtained with sintering temperatures as low as 1300° C.

The sintered bead of the invention preferably also presents one or more of the following optional characteristics:

the content of alumina ($Al_2O_3$) is greater than 0.2% and/or less than 1%, in percentage by weight;

the content of said additive is greater than 0.3%, and/or less than 0.8%, in percentage by weight;

the total content of alumina plus said additive is greater than 0.6%, preferably greater than 0.7%, in percentage by weight;

the additive is MnO and/or $Fe_2O_3$;

the content of $CeO_2$ is less than or equal to 20% by weight;

the ratio between the percentage of the additive and the percentage of the alumina is greater than 0.5 and/or less than 2. It is preferably greater than 0.7 and/or less than 1.5, and more preferably it is substantially equal to 1.

The invention also provides the use of a mixture of beads of the invention in a grinder, in particular for microgrinding or microdispersing pigments.

Unless stated to the contrary, in the present description, all compositions for a bead are given in percentages by weight, on the basis of the total weight of the bead.

The term "impurities" is used to mean all of the other ingredients provided by the raw materials, e.g. CaO. It is considered of a total content of impurities of less than 1% does not significantly modify the results obtained.

In the present description, of the term "additive" can mean not only $MnO$, $MnO_2$, $Fe_2O_3$, $CuO$, $TiO_2$, $Y_2O_3$, $Sb_2O_3$, or $ZnO$, but also a mixture of these ingredients.

The quantity of cerium oxide $CeO_2$ is determined so that the sintered bead of the invention has substantially no zirconia in monoclinic form. A minimum quantity of 15% relative to the weight of the other oxides of the bead is considered to be necessary. Nevertheless, the quantity of $CeO_2$ is preferably not more than 20%, since $CeO_2$ is very expensive.

In order to fabricate beads of the invention, it is possible to proceed as follows.

An aqueous suspension comprising powders of $ZrO_2+HfO_2$, $CeO_2$, $Al_2O_3$ and, where appropriate, one or more of the following oxides: $MnO$, $MnO_2$, $Fe_2O_3$, $CuO$, $TiO_2$, $Y_2O_3$, $Sb_2O_3$, $ZnO$ is initially prepared at ambient temperature. The sources of these ingredients are selected in such a manner that the total content of impurities is less than 1% in percentage by weight of the dry matter of the ingredients of the bead of the invention.

The aqueous suspension presents a dry matter content lying in the range 50% to 70%.

As is well known to the person skilled in the art, the suspension may also contain the following ingredients:

a dispersant, at a concentration of 0 to 10% by weight relative to the weight of the dry matter;

a viscosity stabilizer, or deflocculating agent, at a concentration of 0 to 3% in percentage by weight relative to the weight of the dry matter; and a modifier of surface tension, at a concentration of 0 to 3% in percentage by weight relative to the weight of the dry matter;

a gelling agent at a concentration of 0 to 2% in percentage by weight relative to the weight of the dry matter.

Dispersants or deflocculating agents, modifiers of surface tension, and gelling agents are well known to the person skilled in the art. The same applies to electrolytes adapted to react with a determined gelling agent.

As examples, the following may be mentioned:

as dispersants or deflocculating agents, the family of sodium or ammonium polymethacrylates, the family of sodium or ammonium polyacrylates, the family of polyacrylic acids (sodium or ammonium salts), or other polyelectrolytes, the family of citrates, e.g. of ammonium, the family of sodium phosphates, and the family of carbonic acid esters;

as surface tension modifiers, organic solvents such as certain aliphatic alcohols; and as gelling agents, certain elements of the family of natural polysaccharides.

All of these elements disappear during subsequent fabrication steps. They therefore do not contribute to the composition of beads of the invention.

The powders used, in particular the powders of $ZrO_2$ and of $CeO_2$, preferably present a median diameter smaller than 1 micrometer (μm), preferably smaller than 0.5 μm.

Drops of the suspension are then obtained by causing the suspension to flow through a calibrated orifice. The drops leaving the orifice fall into a bath of a gelling solution (electrolyte reacting with the gelling agent) in which they harden after being transformed in a shape that is substantially spherical. The hollow beads thus obtained are then extracted from the bath, dried, and then sintered in air, at atmospheric pressure.

The duration of the sintering preferably lies in the range 2 hours (h) to 5 h.

The resulting sintered beads conventionally have a diameter lying in the range 0.5 millimeters (mm) to 2.5 mm.

The following nonlimiting examples are given for the purpose of illustrating the invention.

Sintered beads were prepared from a source of zirconia (median diameter<5 µm), from a source of $CeO_2$ (median diameter<10 µm), and from a source of alumina (median diameter (d50) of 0.4 µm). The purity of the zirconia and $CeO_2$ sources was greater than 98%. The powders were mixed and then ground together in a wet medium until a mixture was obtained presenting fine grain size (median diameter<1 µm, preferably <0.5 µm). The mixture was then dried.

The mixture was then used to prepare an aqueous suspension comprising, in percentages by weight of the dry matter: 7.5% of a polyacrylic acid type dispersant; 1.95% of n-butanol (surface tension modifier); 1% of a deflocculating agent of the carbonic acid ester type (viscosity stabilizer); and 1% of a gelling agent, namely a polysaccharide of the alginate family.

A ball grinder was used in this preparation so as to obtain a suspension with good uniformity. A solution containing the gelling agent was made initially. Thereafter the following were added: the additive and the alumina; then the $ZrO_2/HfO_2$ and $CeO_2$ powder; then the dispersant, then the surface tension modifier; and finally water in sufficient quantity to enable good mixing to be achieved. The resulting mixture was stirred for 8 h. Then the deflocculating agent was added, and the mixture was stirred for 0.5 h. Finally, water was added in a quantity determined to obtain an aqueous suspension having 65% of dry matter and having viscosity, as measured using a Brookfield viscosity meter, of less than 8500 centipoise (cP). The pH of the suspension was then about 9.

The suspension was forced through a calibrated hole at a rate enabling beads to be obtained after sintering having a size of about 1.2 mm in the context of this example. The drops in suspension fell into a gelling bath based on an electrolyte constituted by a divalent or trivalent cation salt that reacts with the gelling agent. The raw beads were then collected, washed to eliminate excess reagents, and then dried at 90° C. to eliminate moisture. The beads were then transferred into a sintering oven where they were raised to the desired temperature for a duration of 4 h at a rate of 5° C./h.

Two series of tests were performed on sintered beads presenting different compositions and obtained using the above described method. In the first series of tests, the sintering temperature was kept constant at 1300° C., and the influence of bead composition on bead density was observed independently of sintering temperature. In the second series of tests, the sintering temperature was set in such a manner that all of the beads tested presented substantially identical density. It was thus possible to observe the influence of bead composition on the rate of wear, independently of density.

Wear resistance was evaluated by loading a 1 liter (L) attrition type disk grinder with 770 grams (g) of sintered beads in an aqueous suspension containing 10% by weight of a ceramic powder suitable for simulating the application. Thereafter, the speed of rotation was adjusted and maintained in such a manner that the peripheral speed was 10 meters per second (m/s) for 80 h. Thereafter the loss of weight of the beads was measured. The wear rate, given as a percentage, corresponds to the ratio of the weight difference between the beads before and after grinding divided by the weight of the beads before grinding.

Table 1 below summarizes the results obtained.

TABLE 1

| Test | Composition (% by weight) | | | Density of beads sintered at 1300° C. ($g/cm^3$) | Wear test | |
|---|---|---|---|---|---|---|
| | $Al_2O_3$ | Additive | | | Rate (%) | Density of tested beads ($g/cm^3$) |
| | | Rate (% by weight) | Nature | | | |
| 1 | 0.75 | 0.00 | | 6.03 | 0.91 | 6.176 |
| 2 | 0.00 | 0.50 | MnO | 5.96 | NA | |
| 3 | 0.65 | 0.10 | MnO | 6.13 | 0.65 | 6.161 |
| 4 | 0.38 | 0.37 | MnO | 6.17 | 0.49 | 6.173 |
| 5 | 0.25 | 0.50 | MnO | NA | 0.57 | 6.182 |
| 6 | 0.15 | 0.60 | MnO | 6.15 | NA | |
| 7 | 0.50 | 0.50 | MnO | 6.14 | NA | |
| 8 | 0.00 | 0.50 | $MnO_2$ | 5.99 | 1.06 | 6.114 |
| 9 | 0.65 | 0.10 | $MnO_2$ | 6.12 | 0.73 | 6.183 |
| 10 | 0.10 | 0.65 | $Fe_2O_3$ | 6.20 | 0.62 | 6.185 |
| 11 | 0.65 | 0.10 | CuO | 6.19 | 0.84 | 6.155 |

NA: "not available"

The compositions of Table 1 also include 16.5% of $CeO_2$, an impurity content of less than 1%, and a balance up to 100% of $ZrO_2+HfO_2$.

The first series of tests in Table 1 shows that the presence of alumina in the beads of the invention gives rise to higher density for a given sintering temperature. The density is even higher when in the composition further contains an additive selected from MnO, $MnO_2$, $Fe_2O_3$, and CuO. The highest densities were obtained with the additives CuO and $Fe_2O_3$.

The second series of tests in Table 1 serves to show that the wear rate as measured for beads of different compositions all having substantially the same density is significantly improved when the composition comprises not only alumina, but also at least one additive selected from MnO, $MnO_2$, $Fe_2O_3$, and CuO. Surprisingly the simultaneous use of alumina and at least one additive selected from MnO, $MnO_2$, $Fe_2O_3$, and CuO makes it possible to obtain results that are much better than the mean value of the results obtained when adding only alumina or when adding only the additive. Alumina and the additive thus act in synergy.

The best wear resistance is obtained with MnO and $Fe_2O_3$, which are the preferred additives. Composition 4 is the most preferred.

Preferably, the total content of additive, as a percentage by weight, is greater than or equal to 0.2%, preferably 0.3%, more preferably 0.5%.

Preferably, the ratio between of the percentage of additive and a percentage of alumina lies in the range 0.5 to 2, preferably the range 0.7 to 1.5. This ratio is preferably substantially equal to 1.

The composition preferably includes MnO as its sole additive. Also preferably, the alumina content, as a percentage by weight, is greater than or equal to 0.2%, preferably 0.3%.

As can be clearly seen at this point, the invention provides a sintered bead presenting good wear resistance and capable of being fabricated by sintering at temperatures that are relatively low.

Naturally, the invention is not limited to the examples and implementations described above. In particular, other gelling systems are suitable for fabricating a ceramic bead of the invention. Thus, U.S. Pat. No. 5,466,400, FR 2 842 438, and U.S. Pat. No. 4,063,856 describe sol-gel methods that are applicable. FR 2 842 438 and U.S. Pat. No. 4,063,856 use a gelling system close to that described above (based on alginate), while U.S. Pat. No. 5,466,400 describes a system that is very different.

The invention claimed is:

1. A sintered bead to serve in microgrinding or microdispersion applications, said bead being obtained by sintering of a mixture comprising a source of zirconia, a source of $CeO_2$, and a source of alumina, said bead presenting the following chemical analysis, in percentages by weight and for a total of 100%:
   $ZrO_2+HfO_2$: ≥78%
   $CeO_2$: ≥15%;
   $Al_2O_3$: >0.1%;
   additive: >0.1% and <0.8%;
   additive/$Al_2O_3$ between 0.5 and 2; and
   impurities: <1%;
   the additive being selected from the group consisting of $MnO$, $MnO_2$, $Fe_2O_3$, $CuO$, $Sb_2O_3$, $ZnO$, and mixtures thereof.

2. The sintered bead according to claim 1, wherein the content of alumina ($Al_2O_3$) is greater than 0.2% in percentage by weight.

3. The sintered bead according to claim 1, wherein the content of alumina ($Al_2O_3$) is less than 1% in percentage by weight.

4. The sintered bead according to claim 1, wherein the content of alumina ($Al_2O_3$) is greater than 0.2% and less than 1% in percentage by weight.

5. The sintered bead according to claim 1, wherein the content of said additive is greater than 0.3% in percentage by weight.

6. The sintered bead according to claim 1, wherein the total content of alumina plus said additive is greater than 0.6% in percentage by weight.

7. The sintered bead according to claim 1, wherein the ratio between the percentage of the additive and the percentage of the alumina is greater than 0.7 and less than 1.5.

8. The sintered bead according to claim 1, wherein the ratio between the percentage of the additive and the percentage of the alumina is substantially equal to 1.

9. The sintered bead according to claim 1, wherein the content of $CeO_2$ is less than or equal to 20% by weight.

10. The sintered bead according to claim 1, wherein the content of alumina ($Al_2O_2$) is greater than 0.2% and less and 1%, in percentage by weight, and wherein the content of said additive is greater than 0.3% and less than 0.8%, in percentage by weight.

11. The sintered bead according to claim 1, wherein the content of alumina ($Al_2O_3$) is greater than 0.2% and less and 1%, in percentage by weight, wherein the content of said additive is greater than 0.3%, in percentage by weight.

12. The sintered bead according to claim 1, wherein the additive is $MnO$ and/or $Fe_2O_3$.

13. The sintered bead according to claim 1, wherein the additive is selected from the group consisting of from the group consisting of $MnO$, $MnO_2$, $Fe_2O_3$, $CuO$, and mixtures thereof.

14. The sintered bead according to claim 1, wherein the sintered bead has a diameter lying in a range of 0.5 mm to 2.5 mm.

15. The sintered bead according to claim 1, wherein the sintered bead has substantially no zirconia in monoclinic form.

16. A method of fabricating the sintered bead according to claim 1, comprising:
   flowing a suspension through a calibrated orifice to obtain drops, said drops leaving the orifice to fall into a bath of a gelling solution in which they harden after being transformed in a shape that is substantially spherical, the obtained bead being then extracted from the bath, dried and sintered,
   wherein the suspension comprises powders of $ZrO_2+HfO_2$, $CeO_2$, $Al_2O_3$ and, where appropriate, one or more of oxides selected from $MnO$, $MnO_2$, $Fe_2O_3$, $CuO$, $Sb_2O_3$ or $ZnO$ in quantities such that sintering of a drop of said suspension leads to the bead.

17. A grinder for microgrinding and microdispersing pigments, comprising:
   the mixture of beads according to claim 1.

18. The sintered bead according to claim 1, wherein the bead has a diameter in a range of 0.5 mm to 2.5 mm.

19. The sintered bead according to claim 1, wherein the bead has a wear rate of 0.49% to 0.57%.

20. The sintered bead according to claim 1, wherein the bead has a density of 6.173 g/cm³ to 6.182 g/cm³.

* * * * *